(12) United States Patent
Todd et al.

(10) Patent No.: US 8,549,048 B2
(45) Date of Patent: Oct. 1, 2013

(54) WORKFLOW DATABASE FOR SCALABLE STORAGE SERVICE

(75) Inventors: Stephen Todd, Shrewsbury, MA (US); Michel Fisher, Natick, MA (US); Paul M. Bober, Lexington, MA (US); Steven M. Blumenau, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 2994 days.

(21) Appl. No.: 10/024,796

(22) Filed: Dec. 19, 2001

(65) Prior Publication Data

US 2003/0115073 A1    Jun. 19, 2003

(51) Int. Cl.
*G06F 17/00*    (2006.01)

(52) U.S. Cl.
USPC ........... 707/821; 707/813; 707/790; 707/705; 707/687; 707/609

(58) Field of Classification Search
USPC ................. 707/608, 609, 687, 705, 790, 813, 707/821
See application file for complete search history.

(56) References Cited

U.S. PATENT DOCUMENTS

| | | | |
|---|---|---|---|
| 5,550,816 A | | 8/1996 | Hardwick et al. |
| 5,822,780 A | | 10/1998 | Schutzman |
| 5,835,724 A | | 11/1998 | Smith |
| 5,884,284 A | * | 3/1999 | Peters et al. ............... 705/30 |
| 5,918,229 A | | 6/1999 | Davis et al. |
| 5,978,577 A | | 11/1999 | Rierden et al. |
| 6,148,335 A | | 11/2000 | Haggard et al. |
| 6,178,529 B1 | | 1/2001 | Short et al. |
| 6,260,120 B1 | | 7/2001 | Blumenau et al. |
| 6,308,206 B1 | | 10/2001 | Singh |

(Continued)

OTHER PUBLICATIONS

WebConnect, "What We Do", http://www.webconnect.com/site4/WhatWeDo.asp.

(Continued)

*Primary Examiner* — Sana Al Hashemi
(74) *Attorney, Agent, or Firm* — Daly, Crowley, Mofford & Durkee, LLP (57) ABSTRACT

A method of managing workflows related to storage services provided by a service provider to a customer (via a management system) is presented. The management system includes a Web server and a workflow process. The Web server presents to a customer a task screen (or set of task screens) for a customer-selected work order request type so that the customer can prepare and submit a work order request to the management system. After receiving the work order request, the Web server uses information contained in and associated with the request to create a database object that includes some or all of the following elements: customer identifier; work order identifier, date/time of request; request state (e.g., new, open or closed); type of request; parameters or arguments to the request; and any textual description provided by the customer. The Web server stores the object in a database. The workflow process locates the new request in the database, performs the task specified by the request and closes the work order request by updating the object with the appropriate state. The workflow process generates a billable event corresponding to the work order request and enters that billable event in an account record of the customer that submitted the request. The account record can then be used to generate billing information. If the workflow process cannot complete the task successfully, an administrator of the service provider may perform the task, close the work order request and enter the billable event in the customer account record.

23 Claims, 8 Drawing Sheets

(56) References Cited

U.S. PATENT DOCUMENTS

| | | | |
|---|---|---|---|
| 6,345,288 | B1 | 2/2002 | Reed et al. |
| 6,411,943 | B1 | 6/2002 | Crawford |
| 6,421,737 | B1 | 7/2002 | Stone et al. |
| 6,430,611 | B1 | 8/2002 | Kita et al. |
| 6,449,739 | B1 | 9/2002 | Landan |
| 6,516,350 | B1 | 2/2003 | Lumelsky et al. |
| 6,560,611 | B1 | 5/2003 | Nine et al. |
| 6,615,258 | B1 | 9/2003 | Barry et al. |
| 6,649,315 | B1 * | 11/2003 | Takasaki ............. 430/110.3 |
| 6,714,976 | B1 | 3/2004 | Wilson et al. |
| 6,732,167 | B1 | 5/2004 | Swartz et al. |
| 6,754,664 | B1 | 6/2004 | Bush |
| 6,779,016 | B1 | 8/2004 | Aziz et al. |
| 6,785,794 | B2 | 8/2004 | Chase et al. |
| 6,788,649 | B1 | 9/2004 | Dugan et al. |
| 6,795,830 | B1 | 9/2004 | Banerjee et al. |
| 6,816,905 | B1 | 11/2004 | Sheets et al. |
| 6,826,580 | B2 | 11/2004 | Harris et al. |
| 6,829,685 | B2 | 12/2004 | Neal et al. |
| 6,845,154 | B1 | 1/2005 | Cave et al. |
| 6,993,632 | B2 | 1/2006 | Kruckemyer et al. |
| 7,010,493 | B2 | 3/2006 | Yamamoto et al. |
| 7,082,462 | B1 | 7/2006 | Matsunami et al. |
| 7,099,900 | B1 * | 8/2006 | Bromley et al. ............. 707/652 |
| 2002/0095547 | A1 | 7/2002 | Watanabe et al. |
| 2002/0112113 | A1 | 8/2002 | Karpoff et al. |
| 2003/0061057 | A1 | 3/2003 | Todd et al. |
| 2003/0061129 | A1 | 3/2003 | Todd et al. |
| 2003/0097445 | A1 | 5/2003 | Todd et al. |
| 2003/0135385 | A1 | 7/2003 | Karpoff |
| 2005/0049903 | A1 * | 3/2005 | Raja .................................. 705/7 |

OTHER PUBLICATIONS

WebConnect, "ics Tracking System Demo", http://www.webconnect.com/ICS/netbuyer.html.
WebConnect, "WebConnect", 2001, http://www.webconnect.com/site4/main.htm.
WebConnect, "ics Tracking System Demo: Webconnect Report Engine", http://www.webconnect.com/ICS/main_start.html.
TrackingSoft LLC, "Frequently Asked Questions", 2001, http://www.affiliatetracking.net/info/index.shtml.
TrackingSoft LLC, "Feature List", 2001, http://www.affiliatetracking.net/info/feature.shtml.
Budgetware Marketing Group, Inc., "Terms of Service Agreement—Audio Whiz Affiliate Program", 2001, http://www.audiowhiz.com/terms1.htm.
net3media.com, "How about a few . . . GREAT IDEAS!", 1998/2000, http://www.linkcounter.com/ideas.php.
"Page Counters and Off-Site Link Tracking", http://examples.maxum.com/PageCounters/.
Vitual Pages, Inc., "The Ultimate Ad Tracker!", 1996-99, http://ultimateadtracker.com.
Techno Trade Online Solutions, "URL Tracker", http://www.technotrade.com/cgi/redirect.html.
openwddx.org, "Welcome to OpenWWDX.Org", 2001, http://www.openwwdx.org.
openwddx.org, "Web Distributed Data Exchange FAQ", http://www.openwddx.org/faq/.
"Writing CGI Applications with Perl 1/e: Summary", http://www.pearsonptg.com/book_detail/0,3771,0201710145,00.html.
GMD Studios, "Outgoing Link Analyzer—Reflector: Users Guide", 1994-2000, http://www.radiation.com/products/reflector/users_guide.html.
GMD Studios, "Outgoing Link Analyzer—Reflector: Features", 1994-2000, http://www.radiation.com/products/reflector/features.html.
GMD Studios, "Outgoing Link Analyzer—Reflector", 1994-2000, http://www.radiation.com/products/reflector/.
"HighGround SRM Enterprise Edition 4.0", System News, Article #3577, vol. 38, Issue 3, 8 pgs., Apr. 16, 2001.
"New SRM 3.0 Enterprise Edition Now Downloadable", Sunbelt W2Knews Electronic Newsletter, 7 pgs., Nov. 5, 1998.
"Storage Management Best Practices with Sun HighGround Storage Resource Manager Software", Sun Microsystems White Paper, 18 pgs., Jul. 2001.
Jenkins, Ron, "Why Web-based Network Monitoring? Leveraging the Platform," International Journal of Network Management, vol. 9, Issue 3, May 1999, pp. 175-183.
Guiagoussou, M. H.; Boutaba, R.; Kadoch, M., "A Java API for Advanced Faults Management," IEEE/IFIP International Symposium on Integrated Network Management Proceedings, May 14-18, 2001, pp. 483-498.
"Service Provider," Newton's Telecom Dictionary, Harry Newton, Feb. 2002, p. 661.

* cited by examiner

WORKFLOW DATABASE FOR SCALABLE STORAGE SERVICE

BACKGROUND

The invention relates generally to management of data storage resources.

Over the past decade, there have been changes in the marketplace that have had a significant impact on the corporate product delivery environment. Companies and corporate organizations that were at one time totally self-sufficient have chosen to focus development resources solely on products and services that relate to core competencies, and out-source all others. For example, companies that were not in the database business but once had their own proprietary databases have migrated to the use of off the shelf databases from software suppliers.

Further changes are occurring as such companies are faced with new competitive pressures and challenges. Efforts to scale infrastructure to meet ever-increasing demands in areas of bandwidth, computational power and storage are placing tremendous burdens on corporate enterprises. Also, because the World Wide Web has enabled commercial entities with little overhead and few resources to create the appearance of a business of the same type and scale as a much larger company, larger companies have found that they cannot afford the cost of the infrastructure changes if they are to remain competitive. Also of concern is the rising cost of services.

Consequently, companies looking for ways to do more with less are re-evaluating internal services to further refine their market focus, thus making way for a new set of out services and service providers, including the following: (i) the Internet Service Provider (ISP) to provide connectivity; (ii) the Storage Service Provider (SSP) to provide storage resources, e.g., allocate usage of storage devices; (iii) the Application Service Provider (ASP) to provide computational platforms and applications; (iv) the Floorspace Service Provider (FSP) to provide floorspace for rent with all the necessary connections; and the Total Service Provider (TSP) to provide all of the services of providers (i) through (iv) in one package. All of these service providers can be referred to generally as "xSPs".

In addition, just as companies are relying more on outsourcing of products and services, Information Technology (IT) departments within the largest of companies look to reposition themselves as TSPs for their internal customers. They may use outside service providers, but that out-sourcing will be hidden from the internal user. This service delivery approach translates into an environment of tiered service providers—each one providing the same services to each of their customers.

SUMMARY

In one aspect, the invention provides methods and apparatus, including computer program products, for managing workflows in a service provider environment in which a service provider provides data storage resources to a customer. The methods include: (i) providing a customer with a list of types of work order requests based in a permission level associated with the customer, the work order requests comprising requests to manage storage configuration; (ii) receiving a selection of a type of work order request from the customer; (iii) enabling the customer to generate a work order request of the selected type in a work order request submission; (iv) creating a database object based on the work order request; and (v) storing the database object in a database.

Particular implementations of the invention may provide one or more of the following advantages.

The workflow management scheme of the present invention allows a customer or service provider to track work order requests generated by the customer, as well as allows the service provider to generate billable events based on completion of work order requests. In addition, the workflow database can be queried either manually or by an automation to find new requests and perform the task associated with the work order request. It can also be used to store textual information related to the state of the work order and other information. Thus, if an automation is used to perform the task and fails, the xSP Administrator can detect the failure and perform the task manually.

Other features and advantages of the invention will be apparent from the following detailed description and from the claims.

DESCRIPTION OF DRAWINGS

Like reference numbers will be used to represent like elements.

DETAILED DESCRIPTION

Figure 1:
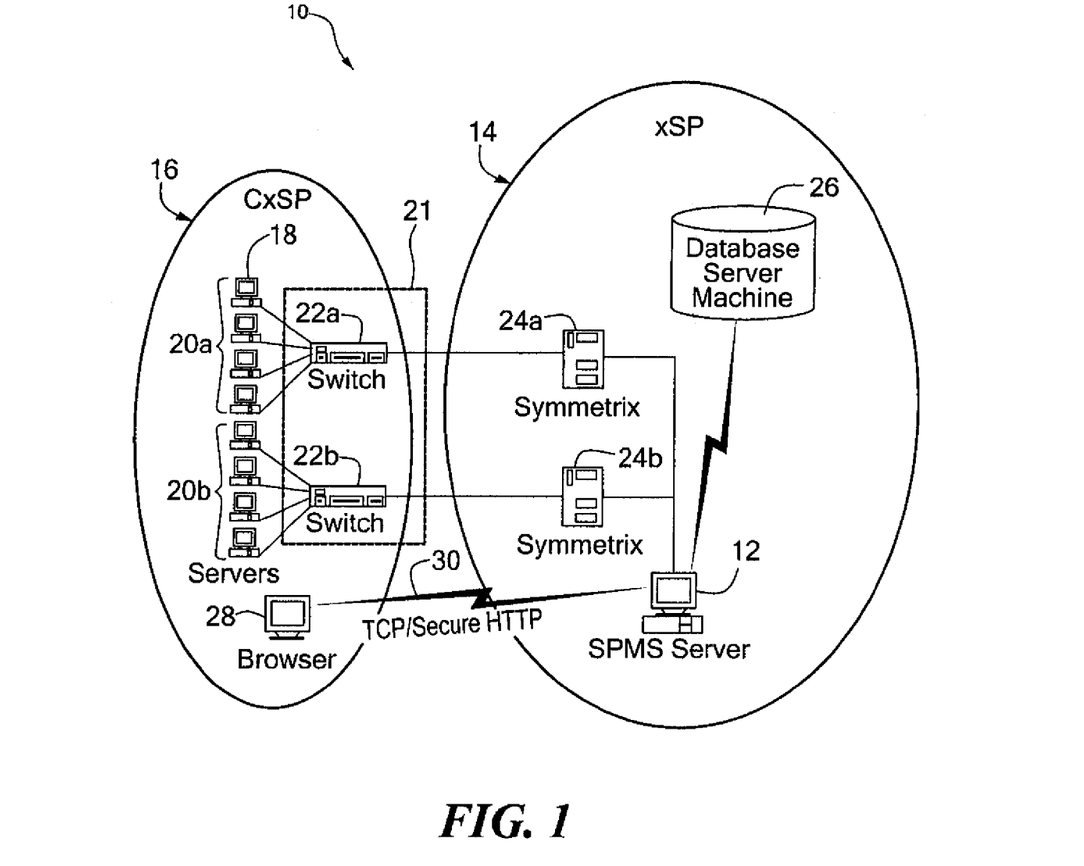
FIG. 1 is a depiction of an exemplary storage service delivery and management environment including a Service Provider Management System (SPMS) server that enables an xSP to provide storage and storage-related services to a customer (CxSP) as a service.

FIG. 1 illustrates an exemplary storage service delivery and management environment 10. Storage provisioning and service management are enabled by a device referred to hereinafter as a Service Provider Management System (SPMS), which is implemented as a server architecture and thus operates on a server machine shown as the SPMS server 12. The SPMS provides the necessary tools to allow service providers to grow a business around their ever-growing datacenters.

There are two target users of the SPMS server 12: an xSP 14 and a customer of the xSP (or "CxSP") 16. In the embodiment shown, the CxSP 16 includes a plurality of host servers 18. The servers 18 are connected to an interconnect 21, which can be a switch-based or hub-based configuration, or some other Storage Area Network (SAN) interconnect. In one embodiment, the interconnect 21 includes one or more switches 22, shown in the figure as a pair of switches 22a and 22b. Thus, some of the servers 18 in a first group 20a are connected to the switch 22a, and the other servers 18 (in a second group 20b) are connected to the other switch 22b. The switch 22a is connected to a first storage system 24a and the switch 22b is connected to a second storage system 24b.

Collectively, the storage systems 24 represent a datacenter within the xSP. Each storage system 24 includes one or more data storage resources, such as a storage device (e.g., disk) or a storage-related service (e.g., data mirroring). For illustrative purposes, the storage systems 24 are shown as Symmetrix storage systems, which are available from EMC Corporation, and the operation of the server 12 is described within the context of a scalable Symmetrix storage infrastructure. However, the storage infrastructure could include other storage system platforms and media types. It will be assumed that the storage in the Symmetrix systems 24 has been segmented into usable chunks.

The storage systems 24 each are connected to the SPMS server 12. Also connected to the SPMS server 12 and residing in the xSP 14 is a database server 26. The database server can be implemented as an Oracle database server or any other commercially available database system. The database server 26 is used to store hardware management and customer information.

As will be further described below, SPMS server architecture can be configured for a number of different service model permutations. In one service model, the CxSP owns the servers and perhaps the switches (as shown in the FIG. 1), which are connected to ports on the storage systems 24 maintained by the xSP, and may or may not allow integration of SPMS components with those servers. In another service model, the xSP owns the servers 18 and/or the switches 22, in addition to the storage systems 24.

In addition to the servers 18 and switches 22, the CxSP 16 includes a browser/GUI 28, which is used as a CxSP console and allows an administrator for the CxSP 16 to perform tasks such as viewing the amount of used and free storage, assigning storage to the servers 18, viewing usage reports and billing information, reports on the general health of the CxSP storage, and other information. The CxSP 16 can run browser sessions from multiple clients simultaneously. The connection from the SPMS client browser 28 to the SPMS server 12 is a TCP connection running secure HTTP, indicated by reference numeral 30. The connection 30 can be a point-to-point Ethernet intranet that is directly cabled from the CxSP 16 to the xSP 14, or some other type of point-to-point network connection that supports TCP/IP transmissions. It should be noted that the SPMS server 12 actually exports two HTTP interfaces: one for the CxSP administrator (via the browser/GUI 28) and another for an xSP administrator (also using a Web-based GUI, not shown).

In one embodiment, the SPMS server 12 is a Solaris machine running an Apache Web server. The server 12 communicates with the database server 26 to store and retrieve customer and storage system (e.g., Symmetrix) information. Of course, the database and the SPMS software could run on the same server. In an xSP environment that maintains multiple SPMS servers, however, the database should be accessible from any one of those SPMS servers located in the same xSP environment, as will be described later.

The SPMS server 12 links storage usage to customer accounts. The SPMS server 12 accomplishes this linkage by associating customer account information with the World Wide Name (WWN) of the Host Bus Adapter (HBA) that is installed on each server 18 in the CxSP 16 and uses the storage, and storing each association in the database 26.

Thus, the SPMS server 12 connects to storage (the storage to be managed, e.g., individual storage systems or systems that may belong to a datacenter or SAN) and the database 26 to store information about the storage and the customers who are receiving the storage as a service. As will be described in further detail below, the SPMS server 12 allows both xSPs and CxSPs to view, change and request storage-related information, as well as assign ownership to billable devices, for example, disks, volumes, ports, switches, servers, server Host Bus Adaptors (HBAs), among others. Multiple levels of ownership can be assigned, including ownership by the service provider (as far as who is responsible for administration of that device), ownership by the customer of the service provider, and sharing of devices by multiple customers (e.g., port-sharing). The SPMS server 12 also allows a service provider to generate billing information based on hardware configuration and customer usage of the configuration, and track events and services (such as mirroring or data backup, for example).

Figure 2:
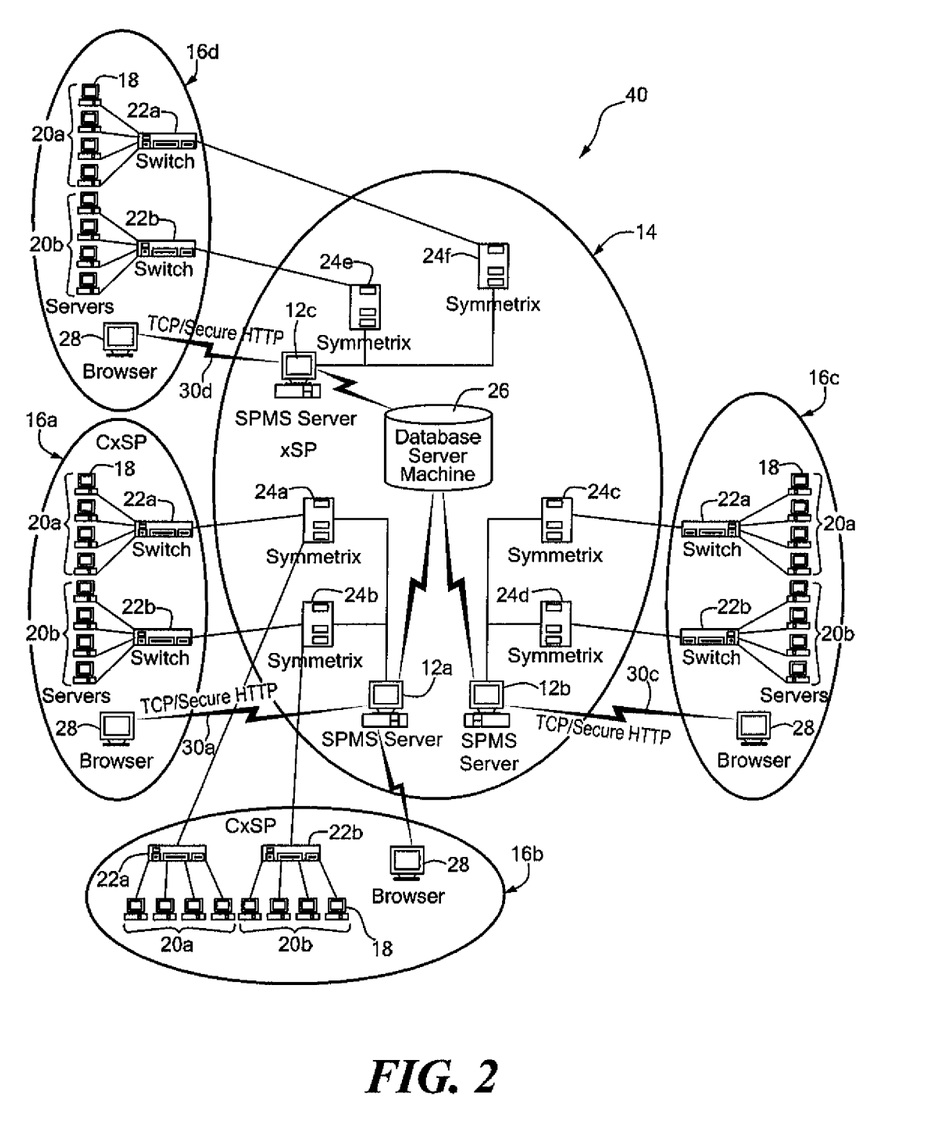
FIG. 2 is a depiction of an exemplary multi-customer storage service delivery and management environment in which multiple SPMS servers are deployed within an xSP.

FIG. 2 illustrates a multi-customer environment 40 in which multiple clients 16 are being served by the xSP site, which has been scaled to include multiple storage system systems 24 as well as multiple SPMS servers 12. The multiple CxSPs 12, shown in this example as four CxSPs 16a, 16b, 16c and 16d, are supported within the environment of the xSP 14. The xSP maintains three SPMS servers, 12a, 12b and 12c, each of which is connected to and manages some subset of available storage systems 24a, 24b, . . . , 24f. In particular, server 12a is connected to storage systems 24a and 24b, the server 12b is connected to storage systems 24c and 24d, and the server 12c is connected to storage systems 24e and 24f.

Servers 18 and switches 22 belonging to CxSP 16a and CxSP 16b are connected to the Symmetrix units 24a, 24b, as shown, which in turn are connected to the SPMS server 12a. The browsers in both CxSPs 12a and 12b are able to communicate with the SPMS server 12a over their respective TCPs connections 30a and 30b to the SPMS server 12a. Therefore, one or more clients can be added to the ports on the Symmetrix units, as well as to an SPMS server that is connected to and manages those Symmetric units. In addition, new storage systems can be added at the xSP site. Each new box would need to be connected to an SPMS server. The xSP also has the option of scaling the solution further by introducing new SPMS servers that are connected to new Symmetrix units, as is illustrated with the addition of servers 12b and 12c. Each new SPMS server has access to the database server 26. Preferably, each SPMS server is responsible for a certain set of storage systems so that there is no overlap among the SPMS servers and the storage systems for which they are responsible. Additionally, if the xSP is concerned about failure of the SPMS server or database server, the SPSM servers and database can be clustered for high availability. The xSP has the option of sharing multiple ports among several customers or dedicating ports exclusively to specific customers.

Figure 3:
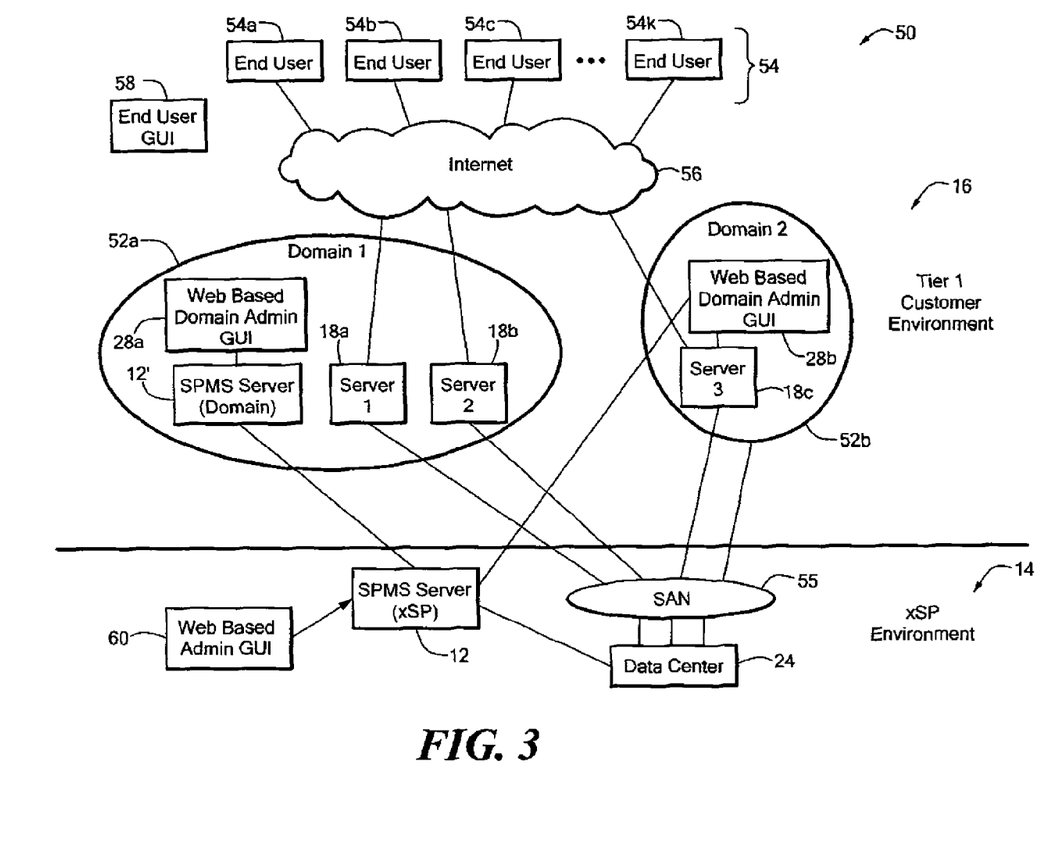
FIG. 3 is a depiction of an exemplary tiered storage service delivery and management environment.

FIG. 3 shows a tiered, managed storage infrastructure environment 50 that includes one or more customer domains 52, e.g., domains 52a ("domain 1") and 52b ("domain 2"), and one or more end user systems 54, e.g. end user systems 54a, 54b, 54c, . . . ,54k. Each customer domain 52 is a logical collection of one or more "domain" servers 18 that are tracked for a single customer. In the example shown, the domain 52a includes servers 18a and 18b, and domain 52b includes server 18c. The servers 18a, 18b, and 18c are connected to the datacenter 24 via a SAN 55. In this illustration, the SAN 55 resides in the xSP environment 14 and includes one or more SAN interconnection devices such as Fibre Channel switches, hubs and bridges. A single customer may have multiple domains. In this environment, the xSP SPMS Server 12 provides to each of the customer domains 52 a Web interface to available storage and storage services in the datacenter 24. The server 12 also tracks usage of each of the services. Associated with each of the services is one of end user systems 54, which communicate with the servers 18a, 18b, and 18c over the Internet 56 using their own GUIs, represented in the figure by end user GUI 58, and one of domain Administrators (via Adminstration GUIs 28a and 28b). The services can include, but need not be limited to, the following: storage configuration, which create volumes and place the volumes on a port; storage-on-demand to enable the end user to allocate storage in a controlled fashion; replication to enable the end user to replicate data from one volume to another in controlled fashion; disaster tolerance management service, if disaster tolerance is available and purchased by the customer; Quality of Service (QoS), which is provided only to the Administrator for controlling performance access; management of data backup services; logging, which logs all actions that take place on the SPMS Server; data extract/access—data is stored in the database and can be accessed or extracted by the Service Provider to pass the information into the billing system. The xSP Adminstrator uses an xSP Web based Administration GUI 60 as an interface to manage the entire environment.

The Web based Domain Administration GUIs 28a and 28b are the Web based interfaces used by the domain administrators for domains 52a and 52b, respectively. Each connects directly to the Service Provider's SPMS server 12 or, alternatively, to a local domain SPMS server (shown as SPMS server 12') and proxies into the xSP environment.

The end user GUI 58 allows a domain end-user, e.g., 54a, to provide a business function to users of that business function. The end-user 54 can also provide storage services through this GUI and a domain SPMS server such as the domain SPMS server 12'.

Thus, the SPMS server 12 can be adapted for deployment in the customer and even the end-user environment, enabling the end-user to cascade out the services. Of course, the SPMS server provides different functionality in the xSP, customer and end user modes.

Figure 4:
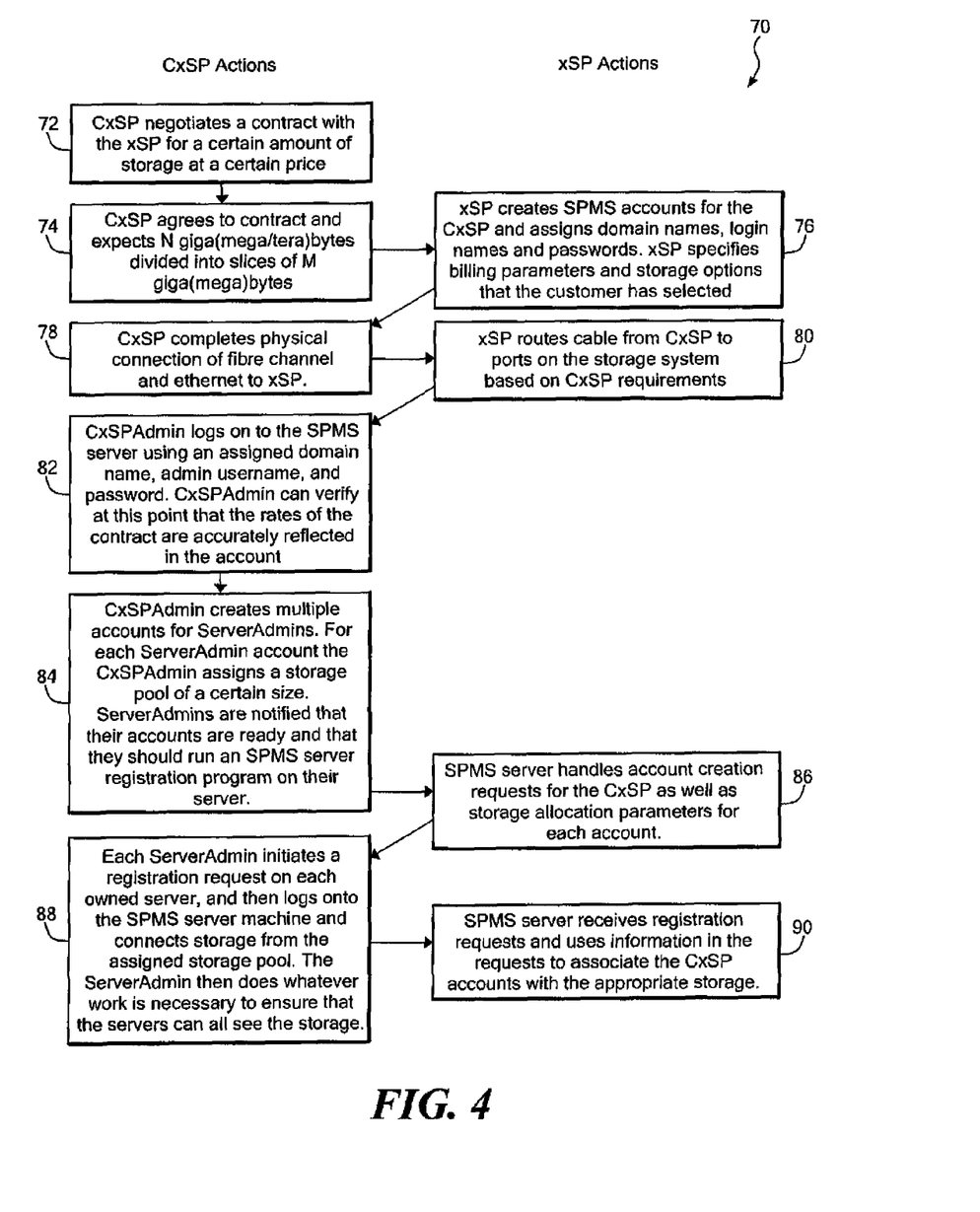
FIG. 4 is a flow diagram illustrating interaction between an xSP and a "new" CxSP.

Before turning to the specifics of the software architecture, it may be helpful to examine the interaction between a new CxSP and an xSP SPMS server when that CxSP acquires storage for the servers in the CxSP environment. FIG. 4 shows a process of associating storage with a CxSP 70 and involves both CxSP actions and xSP actions. The main actions on the part of the CxSP are performed by the Server Administrator ("ServerAdmin") in charge of administration of the storage connected to a given server, and the CxSP Administrator ("CxSPAdmin") in charge of procuring more storage and authorizing it for use by the Server Administration and given server. This process flow assumes that the xSP has already acquired storage and divided that storage into partitions and sizes.

Referring to FIG. 4, the CxSP negotiates a contract with the xSP for a certain amount of storage at a certain price (step 72). Once the parties have agreed to the contract (step 74), the xSP creates SPMS accounts for the CxSP and assigns to the CxSP domain names, login names and passwords for use by the CxSP, and specifies billing parameters and storage options that the CxSP has selected under the agreement (step 76). The CxSP completes the physical connection (e.g., Fibre Channel and Ethernet) to the xSP machines (step 78). The xSP provides the physical connection from the CxSP equipment (e.g., the switches) to ports on the storage system based on the CxSP requirements (step 80). The CxSPAdmin logs onto the SPMS server using an assigned domain name, user name and password, and verifies that the contract terms (e.g., rates) are accurately specified in the account (step 82). The CxSPAdmin creates multiple accounts for ServerAdmins. For each ServerAdmin account, the CxSPAdmin assigns a storage pool of a certain size. The CxSPAdmin notifies the ServerAdmins that their accounts are ready and that they should run an SPMS server registration program on their respective servers (step 84). The SPMS server handles account creation requests for the CxSP as well as storage allocation parameters for each account (step 86). Each ServerAdmin initiates a registration request on each owned server (using the registration program) and logs onto the SPMS server to connect storage from the assigned pool. The ServerAdmin does whatever work is needed to ensure that the servers can see all of the storage allocated to those servers (step 88). The SPMS server receives the registration requests of each server, and uses information in the registration requests to associate the CxSP accounts with the appropriate storage (step 90).

Figure 5:
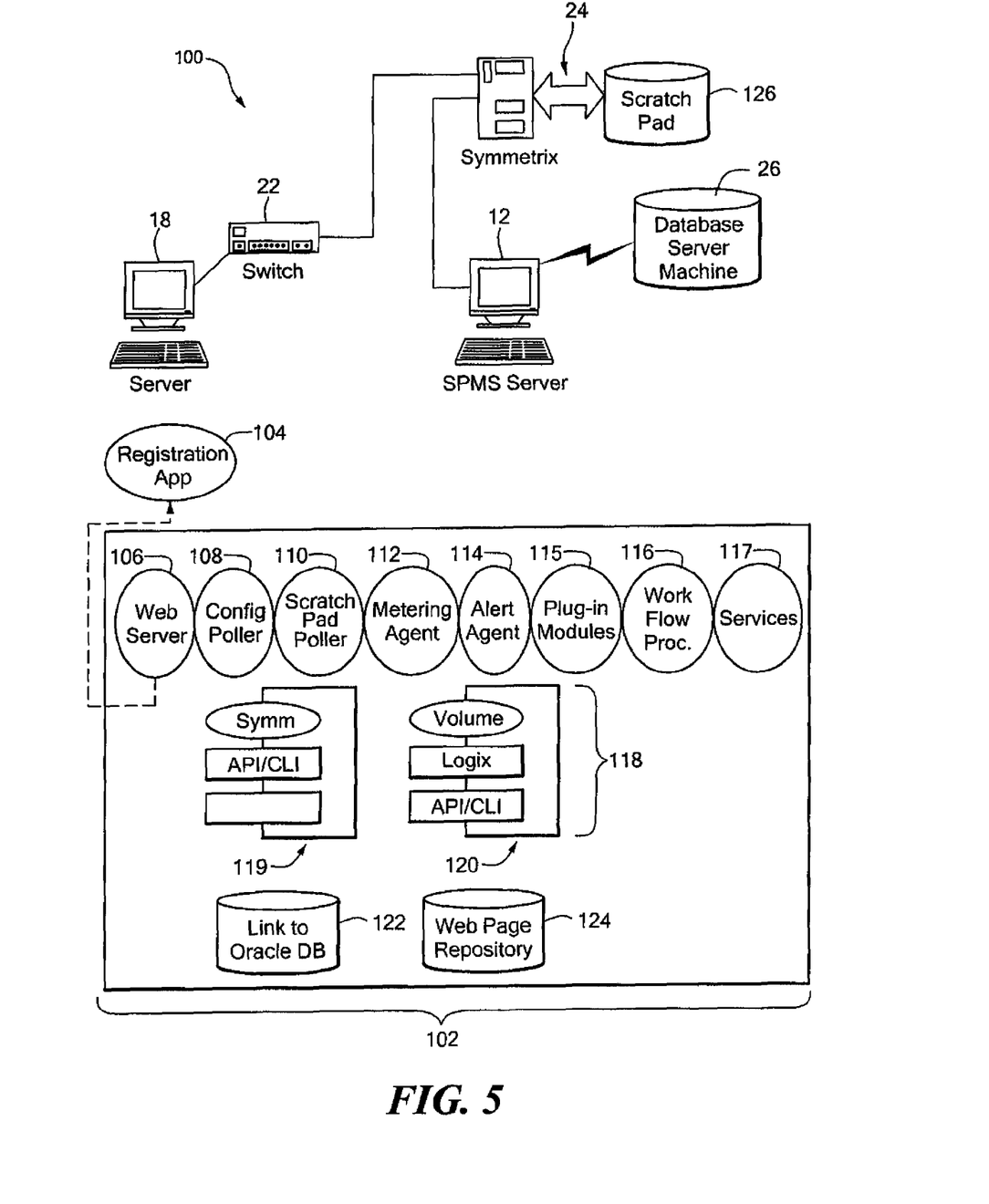
FIG. 5 is a block diagram of an exemplary SPMS server software architecture.

FIG. 5 shows a simple system configuration 100, with a detailed view of the SPMS server software 102. The SPMS software 102 includes a number of components, including an SPMS registration application (SRA) 104, which resides in a tool repository on the server 12, but is executed on each CxSP server 18 attached to the storage 24, and a Web server 106. Also included are various daemons, including a configuration poller 108, a scratch pad configuration poller 110, a metering agent 112 and an alert agent 114, as well as "plug-in" modules 115, a workflow process or automation 116 and services 117. The SPMS software 102 further includes utilities 118, for example, where Symmetrix storage systems are used, a Symmetrix Application Program Interface (API) and/or Command Line Interface (CLI) 118 and Volume Logix API/CLI 120, as well as EMC Control Center (ECC) and scratch pad utilities (not shown). Further included in the software 102 is a link 122 to the database 26 and a Web page repository 124.

It will be appreciated from the system depiction of FIG. 5, as well as FIGS. 1-3, that the SPMS server is not directly connected to the servers 18 that use the storage 24. Because the SPMS server needs information about those servers 18 and associated host bus adapters (HBAs) that are connected to the storage 24, a mechanism which enables an indirect transfer of information from each server 18 to the SPMS server 12 is required. The storage system 24 includes a "scratch pad" 126, which provides for just such a mechanism. In the described embodiment, the SPMS scratch pad 126 is a storage location on the storage system 24 that is used as a temporary holding device through which information is exchanged between the servers 18 and the SPMS server 12. This storage location can be either on the storage media (e.g., on a disk) or in memory of the storage system 18, or any other device "owned" by the xSP and to which the server 18 has access. A scratch pad utility (not shown) is used to read and write to the SPMS scratch pad 126.

The SPMS Web server 106 serves HTML pages to CxSP administrators as well as xSP administrators. The Web server architecture is made up of the following three areas: i) a user domain configuration module, which determines which users can access the Web server 106 and what permissions they have; ii) "back-end" modules which correlate to all of the software logic needed to access the Web pages, execute scripts, etc.; and iii) an external tool repository that contains tools that can be run on the CxSP machines, e.g., the SRA 104, as well as value-added (and chargeable) software for the CxSP to download and run on CxSP servers.

The configuration poller 108 is a process that constantly polls the ports to discover new Symmetrix units that have been added to the xSP site and checks for changes in currently managed Symmetrix units. Any additions are stored in the database and configurations that change are updated in the database. Although the configuration poller 108 is shown as monitoring only Symmetrix devices, it can be used to monitor any resource managed by the SPMS server 12. In one embodiment, the configuration poller 108 uses the plug-in modules 115 to perform the polling function in a manner that recognizes new hardware and services, as described in co-pending U.S. patent application entitled "Pluggable Devices, Services and Events for a Scalable Storage Architecture," filed on Nov. 20, 2001 in the name of Todd et al., and incorporated herein by reference.

The scratch pad poller 110 is a process whose job it is to poll all connected Symmetrix scratch pads, and is used to collect in-bound scratch pad information as well as direct outbound information to the scratch pad 126. In particular, it continually checks for transmit requests from registration applications. It retrieves each incoming request, validates the user and, if a valid request, causes the registration information to be stored in the database and a status to be returned to the registration application via the scratch pad 126. Additionally, if the scratch pad poller detects a new Symmetrix, it creates a scratch pad for that Symmetrix. The scratch pad poller polling interval is user-defined.

The metering agent 112 is responsible for sampling the latest storage system configuration information for the purpose of storing metering records in the SPMS database 26. This information could be, for example, a daily snapshot of the storage system configurations, or more frequent snapshots of storage system performance information. The metering agent 112 performs the following tasks. It finds all connected storage systems at start-up, and stores the IDs of those systems in the database 26. It creates "meter-able" objects or class files, converts the objects to XML, and stores the XML into the SPMS database 26. The metering agent may choose to store the objects directly in the database or go through the SPMS Web server 106. The "meter-able" objects can be, for example, directors, ports, disks, and volumes. The metering agent is programmed to wake up at a user-defined interval.

The SPMS server 12 employs a mechanism for defining thresholds based on available and allocated capacity. The alert daemon 114 is responsible for monitoring these thresholds and sending out email alerts when they are triggered. The alert daemon 114 awakens periodically, and examines the precondition for each alert in an ALERTS table maintained in the database 26. This is done through database operations (i.e., the alert daemon 114 will rely on the configuration poller 108 to keep the database view of the configuration up-to-date). The alert daemon 114 may be generalized to allow alerts to be defined by plug-in Java classes.

The daemons can execute as separate processes or as individual threads inside a single process.

The services 117 include such services as an Oracle DB engine, Oracle reporting services and notification services.

The SPMS server uses the Symmetrix API and/or CLI 118 to gather configuration and performance information from the Symmetrix. For example, the CxSP server administrator may wish to query the SPMS server 12 about the health of the devices on the server. When this request hits the Web server 106, the SPMS server 12 makes an API call to the appropriate storage system 24 to fetch the information. The SPMS server 12 uses Volume Logix utilities 120 for both viewing and setting WWN-to-volume mapping information.

The SPMS server 12 uses the link 122 to access the Oracle database 26 in order to store customer account and billing information, storage system utility and performance information, as well as other information, in the database.

The Web page repository 124 stores HTML Web pages that the Web server 106 serves to the clients, whether they be CxSP administrators or xSP administrators. These Web pages thus take input from the xSP or CxSP user in response to requests, e.g., requests to create user accounts, work order (task-related) requests and others. For example, the Web pages allow the user to run reports to view all of the "meter-able" aspects of assigned storage. Certain HTML pages can allow for the export of information to a third party tool such as a billing application. In one embodiment, style sheets take database information in an XML form and generate a display for the user.

As will be further described below, the SPMS Web server 106 handles work order requests submitted to the xSP 14 by xSP customers. Types of work order requests could include, for example, "connect storage to server", "allocate storage to customer account", "create a mirror", "restore remote mirroring", "split a business continuance volume (BCV)", and so forth. The SPMS Web server 106 accepts the requests and, for each such work order request, creates a corresponding database object, which it stores in the database 26. The object contains such elements as customer identifier, type of work order request, parameter values specified by the customer, status or state of work order request, as will be discussed later.

In the described embodiment, the workflow process 116 processes any new work order request for which a database object has been created and recorded in the database 26 by the Web Server 106. The process 116 examines such database records at predefined intervals and invokes any software on the SPMS server 12, e.g. Volume Logix 120, that is needed to perform tasks specified by the work order request.

Figure 6:
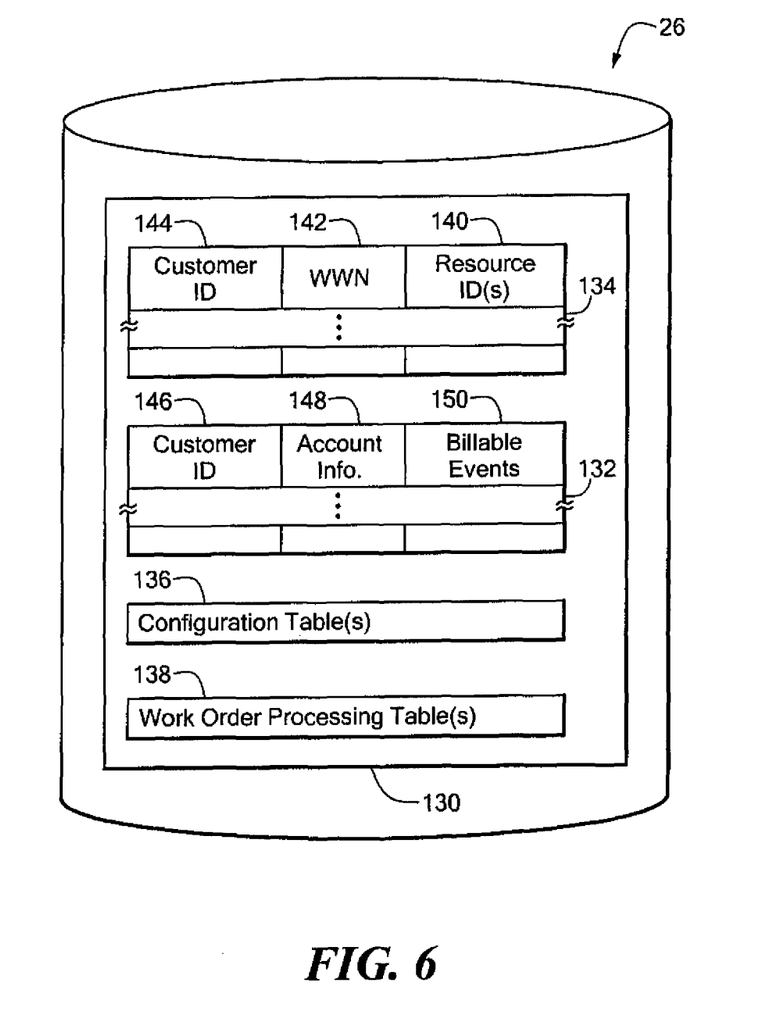
FIG. 6 is a depiction of various database tables created and maintained by the SPMS server, including a work order processing table.

FIG. 6 illustrates the database 26 in some detail. The database 26 includes various tables 130 that are created and maintained by the SPMS server 12. The tables include a customer account table 132, a customer-resource association table 134, one or more configuration tables 136 and one or more work order processing tables 138, among others (not shown). The customer-resource association table 134 includes a field or fields for storing resource identifiers 140, an equipment identifier field 142 for identifying the equipment (that is, server and HBA) connected to the resources specified in field(s) 140. In a Fibre Channel SAN configuration, the identifier stored in the field 142 is the WWN for such equipment. The information in these fields is the result of resource allocation and WWN-to-device mapping by the SPMS server 12 using tools such as the Symmetrix and Volume Logix tools. The table 134 further includes a customer ID field 144 for identifying the customer that "owns" the resources specified in field(s) 140 under the terms of a contract between the customer and the xSP as described earlier. The customer ID field 144 in the table 134 is populated during the registration process. Each entry in the customer account table 132 includes a customer ID field 146 for storing an ID assigned to a customer account, fields for storing account information 148 and fields for storing billable events 150. The fields 146 and 148 are populated with information when a customer's accounted is created by the SPMS server 12. The association of customer ID with the resources that are used by that customer's server (server corresponding to the WWN) in the table 134 allows the SPMS server 12 to track usage of those resources by the customer and generate billable events, which the server 12 stores in the billable events field 150 of that customer's customer account entry in the customer accounts table 132. Preferably, the field 144 stores a customer account ID, but it will be appreciated that any customer information that identifies that customer and allows the SPMS server 12 to access the appropriate entry in the customer accounts table 132 could be used. The billable events can be provided to or are accessed by billing applications. The configuration tables 136 provide the SPMS server 12 with information about the hardware configuration of datacenter 24.

Referring back to FIG. 5, the SRA 104 is used to associate customers and servers with the storage that they use. Once the customer account has been created, as described earlier, the SRA is installed and executed on each of the servers. The details of an overall registration process 160, including the processing of the registration application at the server 18 and the processing that occurs on the SPMS server side, is described in co-pending U.S. patent application Ser. No. 09/962,790, entitled "Scalable Storage Service Registration Application," incorporated herein by reference.

Thus, the customer is required to run a registration application on the server in order to associate the already stored WWN of the HBA (for that server) and resource information with the customer's account. This enables billing and reporting services to be provided.

The SRA must accept as input from the CxSP customer information such as username, password, account ID and customer domain information. The SRA must generate information about the server. There are 4 levels of information that could be generated, including: 1) customer information (username, password, domain, account ID, etc.); 2) hostname, type and revision, HBA WWNs; 3) per HBA, file system and device mapping information; and 4) third party application information (Oracle, Veritas, etc.) Only the first two levels of information are required.

The basic purpose of the SRA 104 is to associate the HBA WWN running in the CxSP server with a customer, more specifically, a customer account. Other information about the customer's server environment can also be pushed down to the SPMS server 12 (via the scratch pad 126) to present more meaningful information about the customer, as discussed above.

The WWN is a Fibre Channel specific unique identifier that is used at both ends and facilitates association of both end points (point-to-point). Preferably, the switch 18 is FC, and therefore the unique identifier is WWN and thus described; however, the switch could be a SCSI MUX, or even a network switch if NAS is part of the infrastructure.

The scratch pad could be used for other types of communication as well. For example, a customer may want the storage allocation to be extended when the free space is below a certain threshold. The server may have a process to monitor free space and put a report in the mailbox. The SPMS retrieves the report and looks at the customer's policy, initiating a workorder to increase the size of the volume if the free space is below threshold. It could also be used to exchange information about billing events, information about server (QoS), as well as other types of information.

As mentioned earlier, there are various utilities 118 needed for proper SPMS server operation. In a Symmetrix environment, they include, for example, the Symmetrix API/CLI 118 for gathering configuration information, Volume Logix 120 for gathering/setting HBA-to-volume mapping information, as well as ECC components for use by the xSP administrator in monitoring the Symmetrix and a utility for managing the SPMS scratch pad.

Referring again to FIG. 6, the work order processing tables 138 maintain information about user-generated work order requests directed to and processed by the xSP 14.

Figure 7:
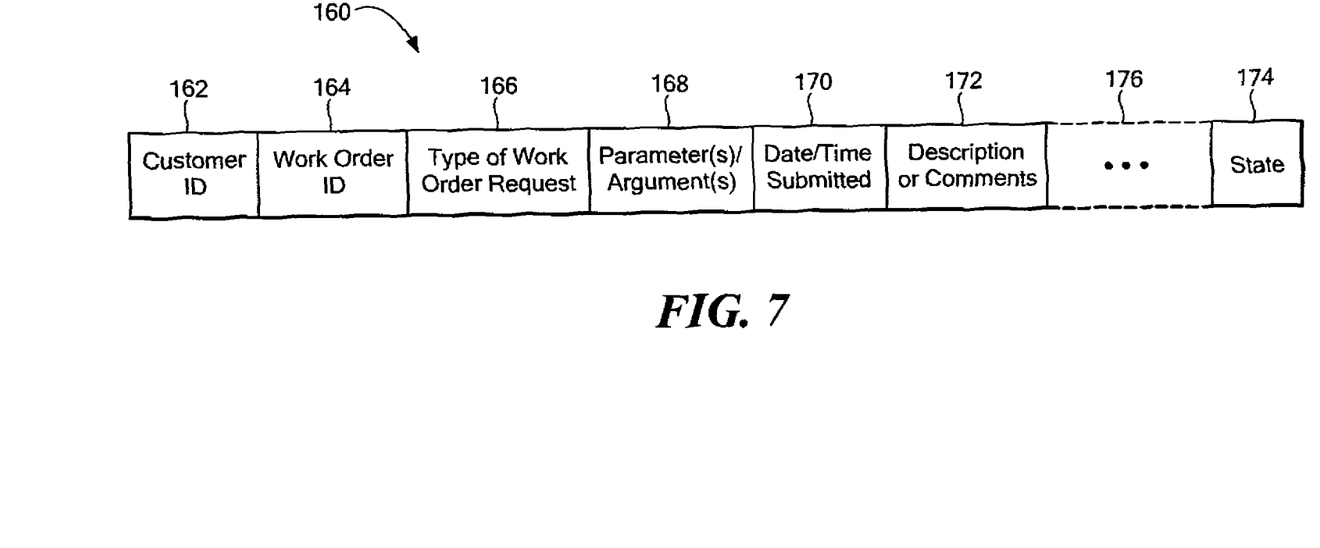
FIG. 7 is a depiction of an exemplary format of an entry in the work order processing table shown in FIG. 6.

Referring to FIG. 7, an exemplary entry 160 in the work order processing table 138 is shown. The work order processing table entry 160 can include the following fields: a customer ID field 162; a work order ID field 164; a request type field 166; one or more parameter fields 168 for storing parameters (as well as arguments) to the request; a date/time field 170 for specifying the date and time the request was made; a description field 172 to store any textual description the customer or xSP wishes to include; and a state field 174 to indicate the state (e.g., "new", "open", "closed", "failed") of the work order request. Additional fields 176 for storing other types of information related to workorder processing may be included as well.

Figure 8:
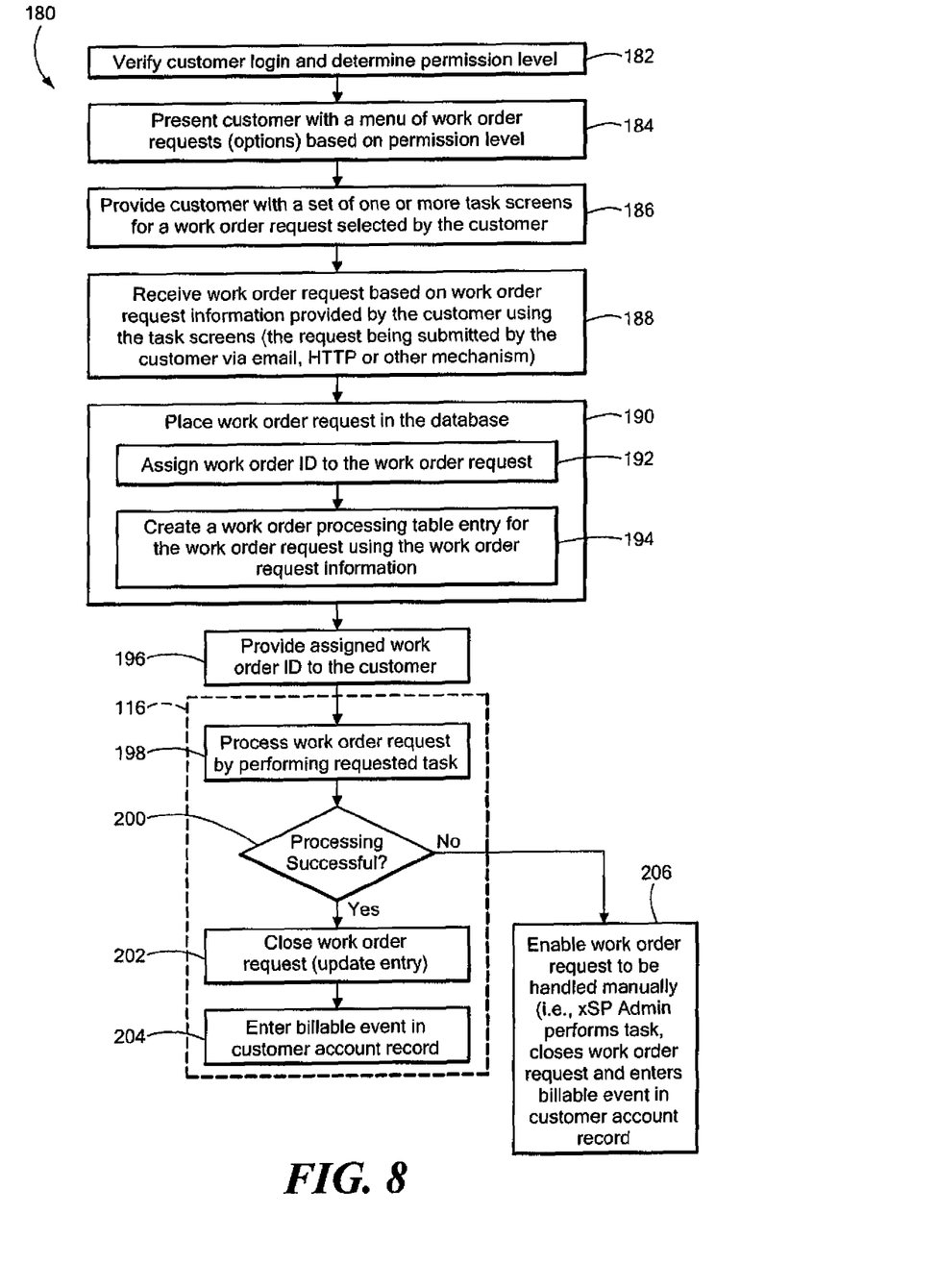
FIG. 8 is a flow diagram illustrating work order submittal and processing.

Referring to FIG. 8, work order submittal and processing 180 operates as follows. When a customer of the xSP connects to the SPMS server 12 via an HTTP connection and logs in, the Web server 106 verifies the login and determines the permission level of the customer (step 182). Based on the determined permission level, the Web server 106 presents the customer with a menu of available work request options (from which the customer is authorized to select) (step 184). The Web server 106 receives a selection from the customer and presents to the customer a set of one or more task screens that correspond to the selected type of work order request (step 186). Once the customer has filled in the appropriate task or work order request information required by the corresponding set of task screens and submitted the work order request to the xSP 14, the work order request is received (step 188) and is placed in the database 26 (step 190) by the Web server 106. More specifically, the Web server 106 assigns a work order ID to the work order request (step 192) and creates an entry in the work order processing table 138 (step 194). Once the work order request and associated information have been stored in the work order processing table entry 138, the assigned work order ID is provided to the customer (step 196). The work order ID can then be used to query the database to locate and view the status of the work order to which the ID was assigned.

It will be appreciated that the customer may submit the request via an email-based submittal system (which may be supported on the server 12 or some other system within the xSP 14) or HTTP, or some other mechanism. If the request is transmitted via email, the xSP 14 (or more specifically, the xSP Administrator) manually creates the workflow database entry 150 and returns to the customer an email confirmation which includes the work order ID. If the submission is received via HTTP, the Web server 106 (or some other software component on the server 12) automatically creates the entry 150 and returns the work order ID to the customer who submitted the request.

Referring to FIGS. 7 and 8, at a predefined time, the workflow process 116 wakes up, locates the new work order in the database work order table entry 150 (based on the setting of the state field 174) and attempts to perform the requested task (step 198), or invokes other software to attempt to perform the requested task, based on the work order request type specified in field 166 and parameter values in parameter field 168 in the entry 150. If the workflow process 116 successfully completes the task or determines that the task as successfully completed (step 200), the workflow process 116 closes the work order request by marking the state in the state field 174 as "closed" (step 202) and enters a billable event into the billable events field 150 in the customer account record for the customer (in the customer account table 132) that submitted the request (step 204). If the workflow process 116 determines that the task could not be completed (at step 200), the work order request is handled manually (step 206). That is, the xSP Administrator queries the table entries 160 based on a state field 174 that indicates a failed work order request to locate the work order in the database 26, uses appropriate tools to carry out the task specified by the work order and, once the task is completed, closes the work order request and enters a billable event into the customer's customer account record.

Alternatively, in lieu of using an automation such as the workflow process 116 to perform (or attempt to perform) the task, or if such an automation is lacking, the actual work order processing can be performed manually by the xSP Administrator from the outset. In other words, the xSP Administrator can query the database to find new or open requests, perform the requested task (if possible) and close the work order when the task is completed. The xSP Administrator can update the state field 174 with an appropriate state indicative of the status of the work order, as well add textual comments to the description field 172 of the workflow item as needed. When the processing and entry updating is performed by the xSP Administrator, the xSP Administrator handles the generation and storing of the billable event as well.

Other aspects of the SPMS architecture not described above may be implemented according to techniques described in co-pending U.S. patent application Ser. No. 09/962,408, entitled "Mediation Device for Scalable Storage Service," incorporated herein by reference.

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A method of managing workflows in a service provider environment in which a service provider provides data storage resources to a customer, comprising:
   providing the customer with a list of types of work order requests to select work to be performed based on a permission level defining a level of access to the data storage resources allowed to the customer, the work order requests comprising requests to manage configuration of the data storage resources provided to the customer, wherein the list of the types of work order requests comprises at least one of requests to:
   create a mirror; or
   restore remote mirroring;
   receiving a selection of a type of work order request from the customer prior to performance of work associated with the selection;
   enabling the customer to generate a work order request of the selected type in a work order request submission;
   creating a database object based on the work order request; and
   storing the database object in a database.

2. The method of claim 1, wherein enabling comprises:
   providing to the customer at least one task screen corresponding to the selected type of work order request and usable by the customer to generate the work order request.

3. The method of claim 1, wherein the work order request comprises values of parameters specific to the selected type of work order request.

4. The method of claim 1, wherein the database object comprises elements that include a customer identifier and the selected type of work order request.

5. The method of claim 4, wherein the elements further include a state to indicate status of the work order request.

6. The method of claim 5, wherein the state is set to indicate a new work order request initially and later changed to indicate a closed work order request.

7. The method of claim 5, further comprising:
   assigning a work order request identifier to the work order request; and
   providing the assigned work order request to the customer.

8. The method of claim 7, wherein the database object is stored in the database as a table entry, the table entry including fields to store information associated with each of the elements.

9. The method of claim 8, wherein the elements further comprise the assigned work order request identifier and the work order request is stored in one of the fields in the table entry.

10. The method of claim 9, further comprising:
    processing the work order request using the table entry, processing comprising attempting to perform any tasks required to satisfy the work order request; and
    updating the state based on the results of the processing.

11. The method of claim 10, wherein updating comprises:
    marking the state to indicate that the work order request is closed if such tasks are performed successfully; and
    marking the state to indicate a failure if such tasks are not performed successfully.

12. The method of claim 10, further comprising:
    generating a billable event when the work order request is closed; and
    storing the billable event in the database in association with the customer identifier and account information.

13. The method of claim 1, wherein work order request submission is in the form of an email.

14. The method of claim 1, wherein work order request submission is in the form of HTTP.

15. The method of claim 10, wherein processing is managed by a workflow automation that periodically queries the database to locate any new work order requests based on the state in the table entry for each work order request.

16. The method of claim 15, wherein the processing, updating, and the generating and storing of the billable event are handled by the workflow automation.

17. The method of claim 15, wherein the workflow automation invokes other processes needed to perform the work order request.

18. The method of claim 10, wherein processing is managed manually by an administrator of the service provider.

19. The method of claim 18, wherein the processing, updating, and the generating and storing of the billable event are handled manually by the service provider administrator.

20. The method of claim 18, wherein the processing, updating, and the generating and storing of billable events are managed manually by the service provider administrator when the state indicates a failure.

21. A computer program product residing on a computer-readable medium for managing workflows in a service provider environment in which a service provider provides data storage resources to a customer, the computer program product comprising instructions causing a computer to:
    provide the customer with a list of types of work order requests to select work to be performed based on a permission level defining a level of access to the data storage resources allowed to the customer, the work order requests comprising requests to manage configuration of the data storage resources provided to the customer, wherein the list of types of work order requests comprises at least one of requests to:
    create a mirror; or
    restore remote mirroring; or
    receive a selection of a type of work order request from the customer prior to performance of work associated with the selection;
    enable the customer to generate a work order request of the selected type in a work order request submission;

create a database object based on the work order request; and store the database object in a database.

22. An apparatus for managing workflows in a service provider environment in which a service provider provides data storage resources to a customer, comprising:

means for providing a customer with a list of types of work order requests to select work to be performed based on a permission level defining a level of access to the data storage resources allowed to the customer, the work order requests comprising requests to manage configuration of the data storage resources provided to the customer, wherein the list of the types of work order requests comprises at least one of requests to:
create a mirror; or
restore remote mirroring;

means for receiving a selection of a type of work order request from the customer prior to performance of work associated with the selection;

means for enabling the customer to generate a work order request of the selected type in a work order request submission;

means for creating a database object based on the work order request; and means for storing the database object in a database.

23. The method of claim 1 wherein the list of the types of work order requests further comprises requests to split a business continuance volume (BCV).

* * * * *